(12) United States Patent
Aoto et al.

(10) Patent No.: US 9,531,030 B2
(45) Date of Patent: Dec. 27, 2016

(54) FUEL CELL

(75) Inventors: Akira Aoto, Okazaki (JP); Tsutomu Kohara, Toyota (JP); Junichi Matsubara, Seto (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 965 days.

(21) Appl. No.: 12/522,060

(22) PCT Filed: Dec. 17, 2007

(86) PCT No.: PCT/JP2007/074612
§ 371 (c)(1),
(2), (4) Date: Aug. 28, 2009

(87) PCT Pub. No.: WO2008/081747
PCT Pub. Date: Jul. 10, 2008

(65) Prior Publication Data
US 2010/0040921 A1    Feb. 18, 2010

(30) Foreign Application Priority Data

Jan. 5, 2007    (JP) ................................. 2007-000499

(51) Int. Cl.
*H01M 8/2465*    (2016.01)
*H01M 8/04*    (2016.01)
*H01M 8/24*    (2016.01)
*H01M 8/10*    (2016.01)

(52) U.S. Cl.
CPC ......... *H01M 8/2465* (2013.01); *H01M 8/2415* (2013.01); *H01M 2008/1095* (2013.01); *Y02E 60/50* (2013.01)

(58) Field of Classification Search
CPC .... H01M 8/2415; H01M 8/04; H01M 8/2465; H01M 2008/1095
See application file for complete search history.

(56) References Cited

U.S. PATENT DOCUMENTS

2002/0187376 A1* 12/2002 Nishiumi ........................ 429/23

FOREIGN PATENT DOCUMENTS

| JP | 2002-362165 | * | 12/2002 | |
| JP | 2002-362165 A | | 12/2002 | |
| JP | 2002-367666 | * | 12/2002 | |
| JP | 2002-367666 A | | 12/2002 | |
| JP | 2005-317408 | * | 11/2005 | .............. H01M 8/24 |
| JP | 2005-317408 A | | 11/2005 | |
| JP | 2006-139972 A | | 6/2006 | |
| JP | 2007-87678 | * | 4/2007 | |
| JP | 2007-087678 A | | 4/2007 | |

(Continued)

*Primary Examiner* — Barbara Gilliam
*Assistant Examiner* — Angela Martin
(74) *Attorney, Agent, or Firm* — Andrews Kurth Kenyon LLP

(57) ABSTRACT

Relays and the like are arranged so that any restriction is not imposed on a portion where a fastening member between end plates or the like is disposed. To realize this, a relay assembly is provided in a stack case. In this case, when the relay assembly is integrated with a service plug, cables between relays and the service plug can preferably be omitted. Moreover, the relay assembly includes a resin plate to which the relays and the service plug are attached, and these relays are electrically connected to the service plug via buses on the resin plate.

7 Claims, 3 Drawing Sheets

(56) References Cited

FOREIGN PATENT DOCUMENTS

| | | |
|---|---|---|
| JP | 2007-128752 A | 5/2007 |
| JP | 2007-207555 A | 8/2007 |
| JP | 2008-59942 A | 3/2008 |
| WO | WO 2007/088865 A1 | 8/2007 |

\* cited by examiner

FUEL CELL

This is a 371 national phase application of PCT/JP2007/074612 filed 17 Dec. 2007, which claims priority to Japanese Patent Application No. 2007-000499 filed 5 Jan. 2007, the contents of which are incorporated herein by reference.

BACKGROUND OF THE INVENTION

Field of the Invention

The present invention relates to a fuel cell. More particularly, the present invention relates to the improvement of the structure of a fuel cell to be received in a stack case.

Description of Related Art

In general, a fuel cell (e.g., a polymer electrolyte fuel cell) has a constitution in which a plurality of cells each including an electrolyte sandwiched between separators are stacked. In a pile of cells (a cell stack) having a constitution in which the cells are stacked in this manner, end plates are provided at both ends of the member in a stack direction of the member, and high voltage components such as relays and bus bars (conductive plates) are further provided sometimes (e.g., see Patent Document 1). Moreover, such a pile of cells is received in a stack case made of, for example, a resin or the like, and connected to an external device (e.g., a PCU or the like) through an output cable.

[Patent Document 1] Japanese Patent Application Laid-Open No. 2002-362165

SUMMARY OF THE INVENTION

However, in the above-mentioned fuel cell, relays and the like are arranged, and hence a restriction might be imposed on a portion where a fastening member (e.g., a tension plate) for fastening end plates to each other is disposed.

To solve the problem, an object of the present invention is to provide a fuel cell capable of arranging relays and the like so that any restriction is not imposed on a portion where a fastening member between end plates or the like is disposed.

To achieve such an object, the present inventors have performed various investigations. For example, the relays of a relay assembly are devices for blocking a current from the fuel cell, but in a structure in which in addition to the relays, a terminal base, an electric leak detector and the like are directly fastened onto the outer surface of each end plate, the number of components to be attached increases. Moreover, the above end plate is usually made of a metal material, and hence not only contact with high voltage components such as the relays needs to be avoided but also a necessary insulation distance needs to be secured. Furthermore, holes for connecting terminals of a so-called service plug (functioning as a current block unit which electrically blocks an output cable and a fuel cell stack, and being used for performing, for example, the maintenance or inspection of the fuel cell stack) need to be provided in a stack case, and a cover for closing the hole is further necessary.

The present inventor has noted such various respects, repeated investigations, and obtained a new finding for solving such a problem. A fuel cell of the present invention has been developed based on such a finding, and has a structure in which a pile of cells including stacked cells is received in a stack case, wherein a relay assembly including relays which block a current from the fuel cell as required is provided in the stack case.

In such a fuel cell, since the relay assembly is provided in the stack case, the relay assembly does not have to be provided with respect to end plates provided at ends of the pile of cells. In consequence, a degree of freedom in another member to be installed on the end plate increases, and hence in a portion where a fastening member between the end plates is disposed, a restriction on the arrangement of the fastening member and the like can be decreased. Moreover, a module is formed in advance, the number of components to be attached is therefore small, and a troublesome operation required for the attachment can be decreased.

In addition, the relay assembly does not have to be provided with respect to the end plates made of, for example, a metal material, so that the insulation distance necessary for the high voltage components (the relays and the like) is easily secured. That is, usually in a conventional structure in which the end plates (made of, for example, an aluminum or SUS material) are provided at both ends of the pile of cells in a stack direction and in which the high voltage components are attached near the end plates, the end plates have a potential which is even slight. Therefore, even when the high voltage components are attached near the end plates, the components need to be attached with distances for insulation being left from the end plates. In actual, the components are disposed with spaces being provided from the end plates to secure the insulation sometimes, which is accordingly disadvantageous for space saving. In this respect, in the fuel cell according to the present invention, the necessary insulation distance is easily secured, which is accordingly advantageous for miniaturization.

In such a fuel cell, the relay assembly is preferably integrated with a service plug which functions as an electric block unit when the maintenance or inspection of the fuel cell is performed. This can obviate the need for cables which connect the relay assembly (the relays) to a main body of the service plug, and hence the fuel cell can be miniaturized.

Moreover, in the fuel cell according to the present invention, the relay assembly includes a resin plate to which the relays and the service plug are attached.

Furthermore, the relays are electrically connected to the service plug via buses on the resin plate. This can obviate the need for any cable used in connecting the relays to the service plug, and hence the miniaturization and further weight saving can be achieved as much as at least the cables. In addition, when the relays are connected to the service plug by the cables as in the conventional example, the lengths of the cables have to be set to a uniform length without any unevenness, but the present invention is preferable in that such a troublesome operation is not performed.

Moreover, in the fuel cell according to the present invention, the stack case is provided with a service plug installation hole to install the service plug so that at least a part of the service plug protrudes externally from the case. In this case, the inside (the pile of cells) of the stack case can electrically be connected to the outside (e.g., a PCU) via the service plug. Additionally, in this case, unlike the conventional example, any terminal connecting hole is not necessary, and any cover for closing the hole is not necessary.

In the above fuel cell, the resin plate is preferably attached to the inner surface of the stack case by an engageable/disengageable device. Moreover, the resin plate is preferably disposed and attached so that high voltage components such as the relays face an outer side opposite to the pile of cells. Furthermore, the side portion of the stack case is preferably provided with the service plug installation hole through which the main body portion of the service plug can extend.

DETAILED DESCRIPTION OF PREFERRED EMBODIMENT

Hereinafter, a preferable embodiment of the present invention will be described with reference to the drawings.

FIGS. 1 to 4 show the embodiment of a fuel cell according to the present invention. A fuel cell 1 of the present embodiment has a structure in which a pile of cells 3 is received in a stack case 11, and a relay assembly 12 is provided in the stack case 11. Hereinafter, first a constitution of the pile of cells 3 and the like constituting the fuel cell 1 will be described, and then the relay assembly 12 formed as described above and an attachment structure of the assembly will be described.

Figure 1:
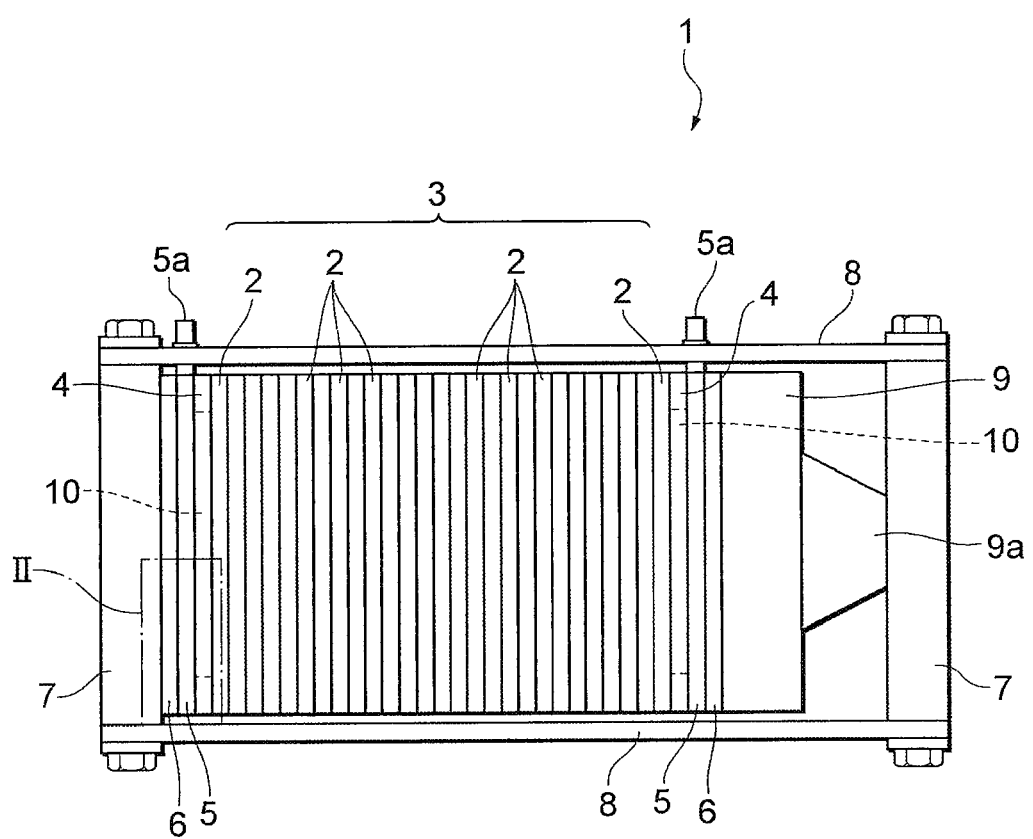
FIG. 1 is a side view showing a structural example of a fuel cell in the present embodiment.
Figure 2:
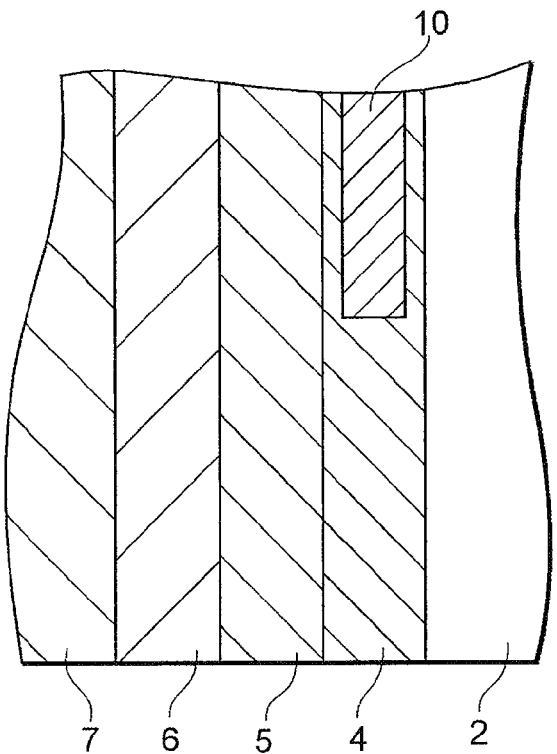
FIG. 2 is an enlarged sectional view of a region 11 shown in FIG. 1.

FIGS. 1, 2 show a schematic constitution of the fuel cell 1 in the present embodiment. It is to be noted that this fuel cell 1 is usable in a car-mounted power generation system of, for example, a fuel cell hybrid vehicle (FCHV), but the present invention is not limited to this example, and the present invention is usable in a power generation system to be mounted in self-sustainable bodies such as various mobile bodies (e.g., a ship, an airplane, etc.) and a robot, and further in a stationary power generation system.

The fuel cell 1 includes the pile of cells (the cell stack) 3 in which a plurality of cells (hereinafter also referred to as the power generation cells) 2 are stacked, and on the outer sides of the end cells 2 positioned at both ends of the pile of cells 3 in a stack direction, terminal plates 5 provided with output terminals 5a, insulators (insulation plates) 6 and end plates 7 are further provided. A predetermined compressive force is added to the pile of cells 3 in the stack direction by tension plates 8 extended to connect both end plates 7 to each other. Furthermore, a pressure plate 9 and a spring mechanism 9a are provided between the end plate 7 and the insulator 6 on one end side of the pile of cells 3, so that the fluctuations of a load exerted onto the power generation cells 2 are absorbed.

Each of the power generation cells 2 is constituted of a membrane-electrode assembly (MEA) including an electrolyte membrane constituted of an ion exchange membrane and a pair of electrodes between which the membrane is sandwiched, and a pair of separators between which this membrane-electrode assembly is sandwiched from the outside. Each of the separators is a conductor made of, for example, a metal as a base material, has a fluid passage for supplying fuel gases such as an oxidizing gas, for example, air and a hydrogen gas to the electrodes, and performs a function of inhibiting the mixture of heterogeneous fluids to be supplied to the power generation cells 2 disposed adjacent to each other. According to such a constitution, in the membrane-electrode assemblies of the power generation cells 2, an electrochemical reaction occurs, and an electromotive force can be obtained. It is to be noted that this electrochemical reaction is a heat generating reaction, and hence the separators are provided with fluid passages through which a refrigerant (e.g., cooling water) for cooling the fuel cell flows.

Furthermore, at, for example, both ends of each separator, there are formed manifolds (an oxidizing gas manifold, a fuel gas manifold and a refrigerant manifold) through which the oxidizing gas, the fuel gas and the refrigerant flow in the cell stack direction, respectively (not shown). In the fuel cell 1 of the present embodiment, the fluids (the oxidizing gas, the fuel gas and the refrigerant) are supplied to inlet-side manifolds from fluid supplying pipes (not shown) provided in the end plate 7 disposed at one end of the fuel cell 1, and flow through the fluid passages provided in the separators of the cells 2. Furthermore, the fluids are discharged from outlet-side manifolds to fluid discharging pipes (not shown) provided in the end plate 7 disposed at the other end of the fuel cell 1.

Each of insulation cells 4 is provided with an insulation layer formed of, for example, two separators and a seal member, and performs a function of suppressing the release of heat generated during the power generation to the atmosphere or the like. That is, usually at the ends of the pile of cells 3, a temperature easily lowers by heat exchange between the ends and the atmosphere, and hence insulation layers are formed on the ends of the pile of cells 3 to suppress the heat exchange (the heat release). Such an insulation layer has a constitution in which instead of the membrane-electrode assembly, an insulation member 10 such as a conductive plate is sandwiched between a pair of separators similar to those of each power generation cell 2 (see FIG. 2). The insulation member 10 for use in this case preferably has excellent insulation properties, and, for example, a conductive porous sheet or the like is specifically used.

It is to be noted that as the seal member, it is possible to use an elastic material (a gasket) which physically comes in close contact with an adjacent member (e.g., the separator) to seal the fluid, an adhesive which chemically bonds to the adjacent member or the like. In the present embodiment, as the seal member, for example, a member for physically sealing due to elasticity is employed, but instead of this member, a member for sealing due to chemical bonding, for example, the above adhesive may be employed. However, specific examples are especially not limited to these examples, and except for these examples, for example, needless to say, a seal member referred to as a sealant, or a gel-like seal material, a liquid-like packing or the like may be used.

The terminal plates 5 are members which function as current collecting plates, and are formed into plate-like members made of a metal such as iron, stainless steel, copper or aluminum. The surface of each terminal plate 5 on the side of the insulation cell 4 is subjected to a surface treatment such as plating, and by such a surface treatment, a contact resistance with respect to the insulation cell 4 is secured. Examples of a plating material include gold, silver, aluminum, nickel, zinc and tin, and in the present embodiment, for example, tin plating is performed in consideration of conductivity, processability and inexpensiveness.

The insulators 6 are members which perform a function of electrically insulating the terminal plates 5 and the end plates 7. To perform such a function, the insulators 6 are formed into plate-like members of a resin material such as polycarbonate. Moreover, when an engineering plastic material having an excellent thermal resistance is employed as the material of the insulators 6, robustness is advantageously obtained, and the weight saving of the fuel cell 1 can preferably be achieved.

The end plates 7 are formed into plate-like members made of any one of various metals (iron, stainless steel, copper, aluminum and the like) in the same manner as in the terminal plates 5. In the present embodiment, the end plates 7 are made of, for example, copper, but this is merely one example, and the end plates may be made of another metal.

Next, the stack case 11 and the relay assembly 12 will be described (see FIGS. 3, 4).

The stack case 11 is a case for receiving the cell stack 3. There is not any special restriction on a specific structure of the stack case 11, but the stack case 11 of the present embodiment has, for example, a structure in which the pile of cells 3 is received and then closed with an upper lid (see FIG. 4).

The relay assembly 12 is one of high voltage components in the fuel cell 1. The relay assembly 12 of the present embodiment is constituted of, for example, a relay assembly resin plate 13, relays 14 arranged on the resin plate 13, bus bars (conductive plates) 15 and a service plug 16, and further a terminal base, an electric leak detector and the like (not shown) (see FIGS. 3, 4). The service plug 16 is connected to a power control unit (PCU) 19 via output cables 18 (see FIG. 4). The PCU 19 includes, for example, an inverter, a DC-DC converter and the like arranged between the fuel cell 1 and a traction motor (not shown).

The relay assembly resin plate 13 is a substrate made of an insulation resin. In the present embodiment, such a resin plate is employed to achieve insulation properties and weight saving in the relay assembly 12.

The relays 14 are devices which block a current from the fuel cell 1 as required. The relays 14 of the present embodiment are connected to the pile of cells (the cell stack) 3 by high voltage cables 17 (see FIG. 4). Furthermore, the relays 14 are connected to the service plug 16 through the bus bars 15.

The service plug 16 functions as a block unit capable of electrically blocking the output cables 18 and the PCU 19 from the pile of cells (the cell stack) 3, for example, when the maintenance or inspection of the fuel cell 1 is performed. For example, the service plug 16 of the present embodiment can be brought into an electrically blocked state, when a service operator or the like removes a plug 16a from a main body portion of the service plug 16 (see FIG. 3).

Figure 3:
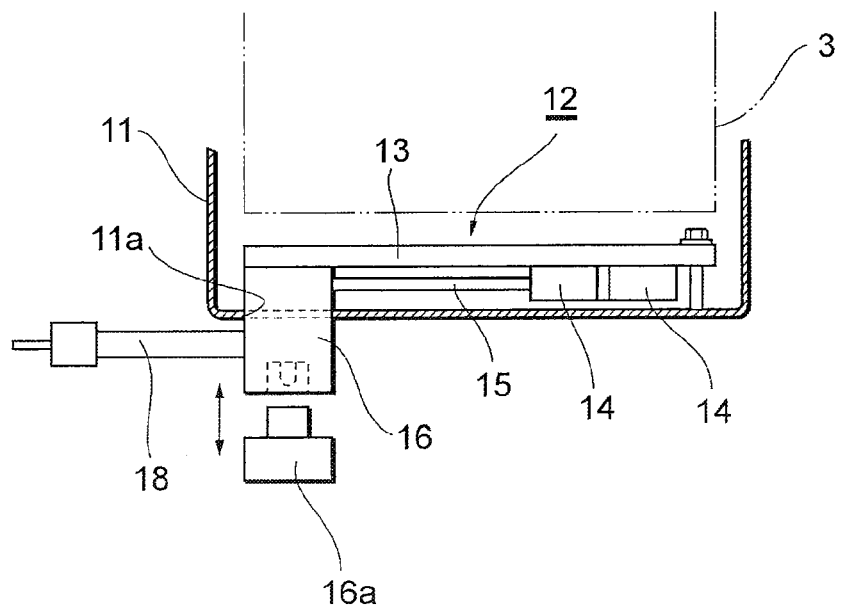
FIG. 3 is a plan view showing a relay assembly attached to a stack case.
Figure 4:
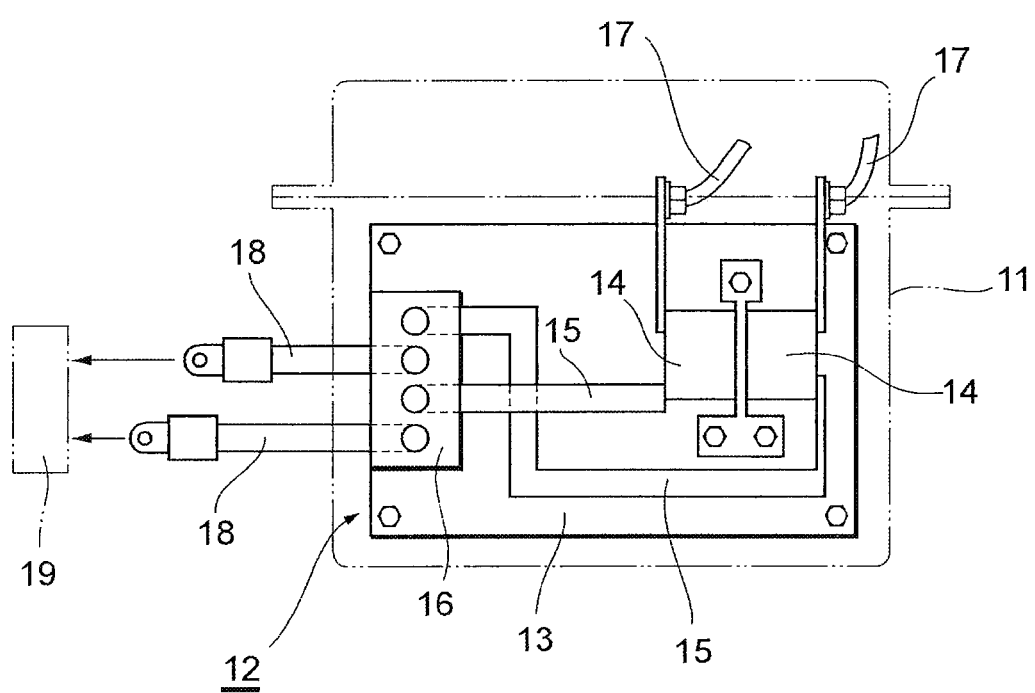
FIG. 4 is a front view showing the relay assembly attached to the stack case.

Here, the fuel cell 1 of the present embodiment has a structure in which the above relay assembly 12 is provided in the stack case 11 (see FIGS. 3, 4). Specifically, the relay assembly resin plate 13 is attached to the inner surface (the side surface) of the stack case 11 by an engageable/disengageable device such as a small screw or a hook. In this case, the relay assembly resin plate 13 is disposed and attached so that the high voltage components (the relays 14, the bus bars 15, etc.) face an outer side (see FIG. 3).

Moreover, in the present embodiment, the side portion of the above stack case 11 is provided with a service plug installation hole 11a through which the main body portion of the service plug 16 extends (see FIG. 3, etc.). The service plug 16 is installed so that, for example, about the half of the main body portion of the service plug protrudes externally from the case, and the service operator can operate the plug 16a of the service plug 16 from the outside of the case (see FIG. 3). Furthermore, a power generated in the pile of cells 3 received in the stack case 11 is forwarded to the PCU 19 outside the case through the service plug 16 and the output cables 18.

In the fuel cell 1 of the present embodiment having the above structure, since the relay assembly 12 is provided in the stack case 11, a degree of freedom in the other members to be installed on the end plates 7 increases. That is, in a conventional example, in addition to the relays 14, the terminal base, the electric leak detector and the like are directly fastened to the outer surfaces of the end plates 7, and hence the number of the components is large. In addition, the components are separately disposed, and hence individually attached by using bolts and the like, and a troublesome operation is required for the attachment. However, in the present embodiment, a component (the relay assembly 12) formed as a module in advance is used, and hence the number of the components is small. In addition, since the relay assembly 12 may be attached in the stack case 11, the troublesome operation required for the attachment decreases.

Additionally, in the case of the conventional fuel cell 1, the pile of cells 3 including the end plates 7 provided with the relays is incorporated and received in the stack case 11, whereas in the present embodiment, the relay assembly 12 (including the relays 14) is attached to the stack case 11 in advance, and then the pile of cells 3 can be incorporated in the stack case 11. Thus, the fuel cell 1 can be assembled in different steps. In addition, in the present embodiment, since the relays 14 and the like are not attached to the pile of cells 3, an incorporating operation into the stack case 11 is accordingly simple sometimes.

Moreover, since the end plate 7 as one of the high voltage components is usually made of the metal, not only contact needs to be avoided but also a necessary insulation distance needs to be secured, when the relays and the like are fastened to the end plates 7. In this respect, in the fuel cell 1 of the present embodiment, a plate (the relay assembly resin plate 13), to which the relays 14 and the electric leak detector (not shown) are attached, is made of a resin, the relay assembly resin plate 13 functions in the same manner as in the terminal base of the conventional example, and hence the conventional terminal base can be omitted.

Furthermore, in the fuel cell 1 of the present embodiment, in a stage before the pile of cells 3 is incorporated into the stack case 11, the service plug 16 can preferably be connected to the terminals of the relays 14 in the stack case 11. That is, in the case of the conventional structure, the relays attached to the end plates 7 of the pile of cells 3 are only fastened to the terminals of the service plug through, for example, holes provided in the stack case 11, and this operation is comparatively laborious. In addition, after the connecting operation, an operation of closing the holes with the cover and fastening bolts and the like need to be performed. On the other hand, according to the fuel cell 1 of the present embodiment, since the operation can be performed in the stack case 11, the operation of the connection or the like is simple. In addition, there is not any gap between the main body of the service plug 16 for connecting the inside of the stack case 11 to the outside and the stack case 11, and hence a component such as the cover is preferably unnecessary.

Additionally, in the fuel cell 1 of the present embodiment, the relay assembly 12 is preferably integrated with the main body of the service plug 16 as described above. That is, the module including not only the relays 14 and the like but also the service plug 16 itself is formed, and these components are connected via the bus bars 15 on the substrate (the relay assembly resin plate 13), which can obviate the need for cables and the like heretofore used for connecting the relays 14 to the service plug 16. Therefore, miniaturization and further weight saving can be achieved as much as at least the cables. In addition, if the relays 14 are connected to the service plug 16 via the cables, the lengths of the cables have to be set to a uniform length without any unevenness (the attachment might not be performed with a usual cable dimensional tolerance), but in the present embodiment, such a troublesome operation is not necessary. Additionally, in a case where the cables of the service plug 16 are thick (a case where an electrically conductive capacity is large and heat release properties have to be taken into consideration or the like), the cables are not easily inserted into the holes of the stack case 11, and hence the troublesome operation is required for connecting the relays 14 to the relay assembly 12, whereas according to the present embodiment, such a troublesome operation is preferably not required. The above respect will be illustrated. In the conventional example, two components (the relay and the service plug) have to be attached separately, and each of the components has to be fastened with, for example, four or five fastening bolts, two connection bolts and the like. On the other hand, according to the fuel cell 1 of the present embodiment, only one module component (the relay assembly 12) may be attached, additionally the above bolts do not have to be used (or less bolts may be used), and hence the troublesome operation required for the attachment is saved. Moreover, in the above structure in which the high voltage components are formed as the module, a component maker can deliver the high voltage components (the relay assembly 12) beforehand attached to the stack case 11, and the number of steps in a final assembly maker can accordingly be decreased.

It is to be noted that the above embodiment is one example of the preferable embodiment of the present invention, but the present invention is not limited to this example, and can variously be modified without departing from the scope of the present invention.

INDUSTRIAL APPLICABILITY

According to the present invention, relays and the like can be arranged so that any restriction is not imposed on a portion where a fastening member between end plates or the like is disposed.

Therefore, the present invention can broadly be used in a fuel cell having such a demand.

The invention claimed is:

1. A fuel cell having a structure in which a pile of cells including stacked cells is received in a stack case,
    wherein a relay assembly including relays which block a current from the fuel cell as required is provided on a resin plate located in the stack case, the relays and resin plate are both spaced from the stacked cells so as not to contact the stacked cells,
    wherein the relay assembly is integrated with a service plug,
    wherein upon removal of a detachable integral piece of the service plug away from and outside of the stack case, the current from the fuel cell is blocked,
    wherein the relay assembly includes the resin plate to which the relays and the service plug are attached, and
    wherein the relays are electrically connected to the service plug via bus bars on the resin plate.

2. The fuel cell according to claim 1, wherein the stack case is provided with a service plug installation hole to install the service plug so that at least a part of the service plug protrudes externally from the case.

3. The fuel cell according to claim 1, wherein the resin plate is attached to the inner surface of the stack case by an engageable/disengageable device.

4. The fuel cell according to claim 3, wherein the resin plate is disposed and attached so that high voltage components such as the relays face an outer side opposite to the pile of cells.

5. The fuel cell according to claim 1, wherein the side portion of the stack case is provided with the service plug installation hole through which the main body portion of the service plug extends.

6. A fuel cell having a structure in which a pile of cells including stacked cells is received in a stack case,
    wherein a relay assembly including relays which block a current from the fuel cell as required is provided on a resin plate located in the stack case, the relays and resin plate are both spaced from the stacked cells so as not to contact the stacked cells,
    wherein the relay assembly is integrated with a service plug;
    wherein upon removal of a detachable integral piece of the service plug away from and outside of the stack case, the current from the fuel cell is blocked;
    wherein the relay assembly includes the resin plate to which the relays and the service plug are attached, and
    wherein the relays are electrically connected to the service plug via bus bars on the resin plate.

7. A fuel cell having a structure in which a pile of cells including stacked cells is received in a stack case,
    wherein a relay assembly including relays which block a current from the fuel cell as required is provided on a resin plate located in the stack case, the relays and resin plate are both spaced from the stacked cells so as not to contact the stacked cells,
    wherein the relay assembly is integrated with a service plug;
    wherein upon removal of a detachable integral piece of the service plug away from and outside of the stack case, the current from the fuel cell is blocked;
    wherein the relay assembly includes the resin plate to which the relays and the service plug are attached; and
    wherein the relays are electrically connected to the service plug via buses on the resin plate.

* * * * *